Patented Aug. 4, 1936

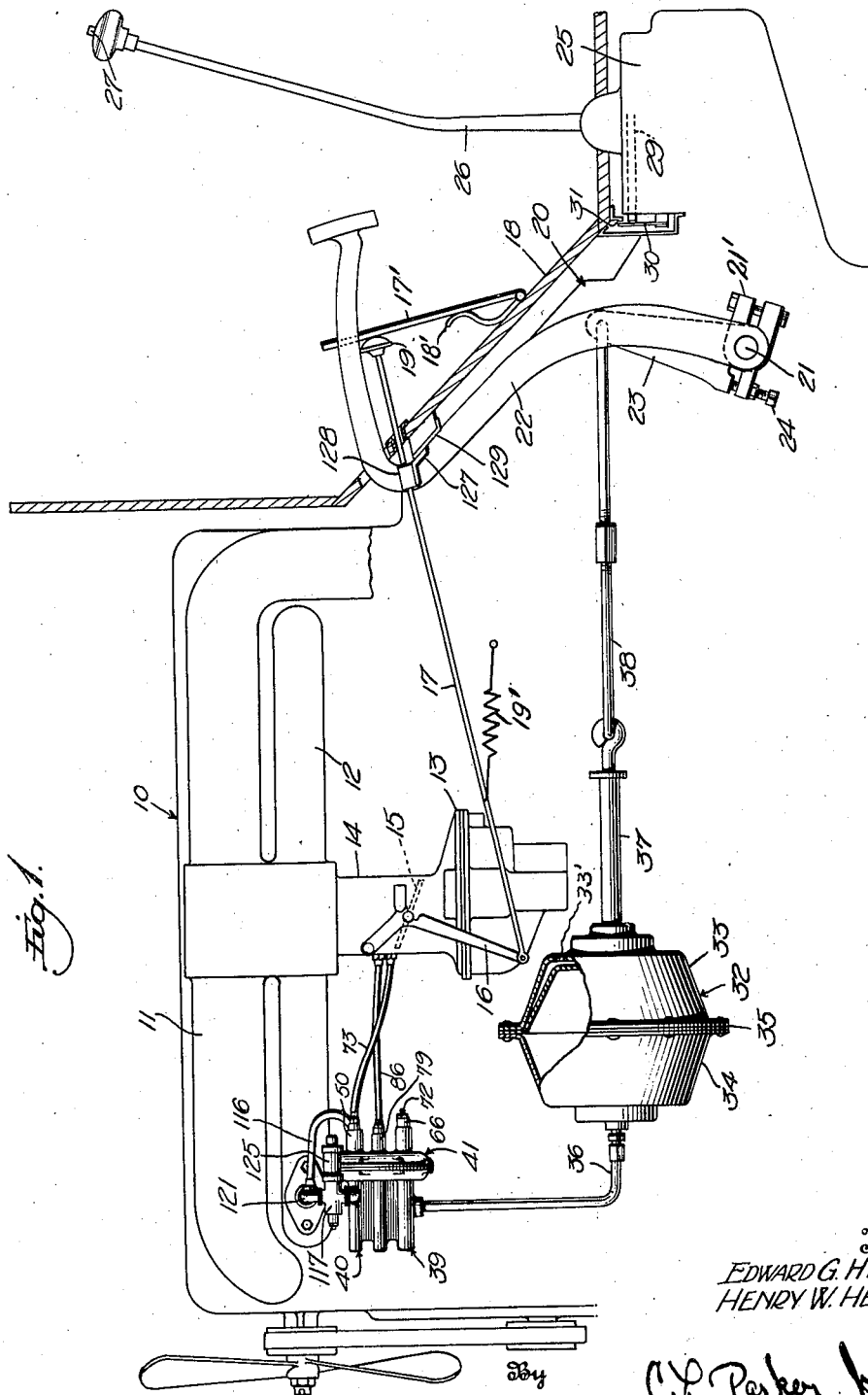

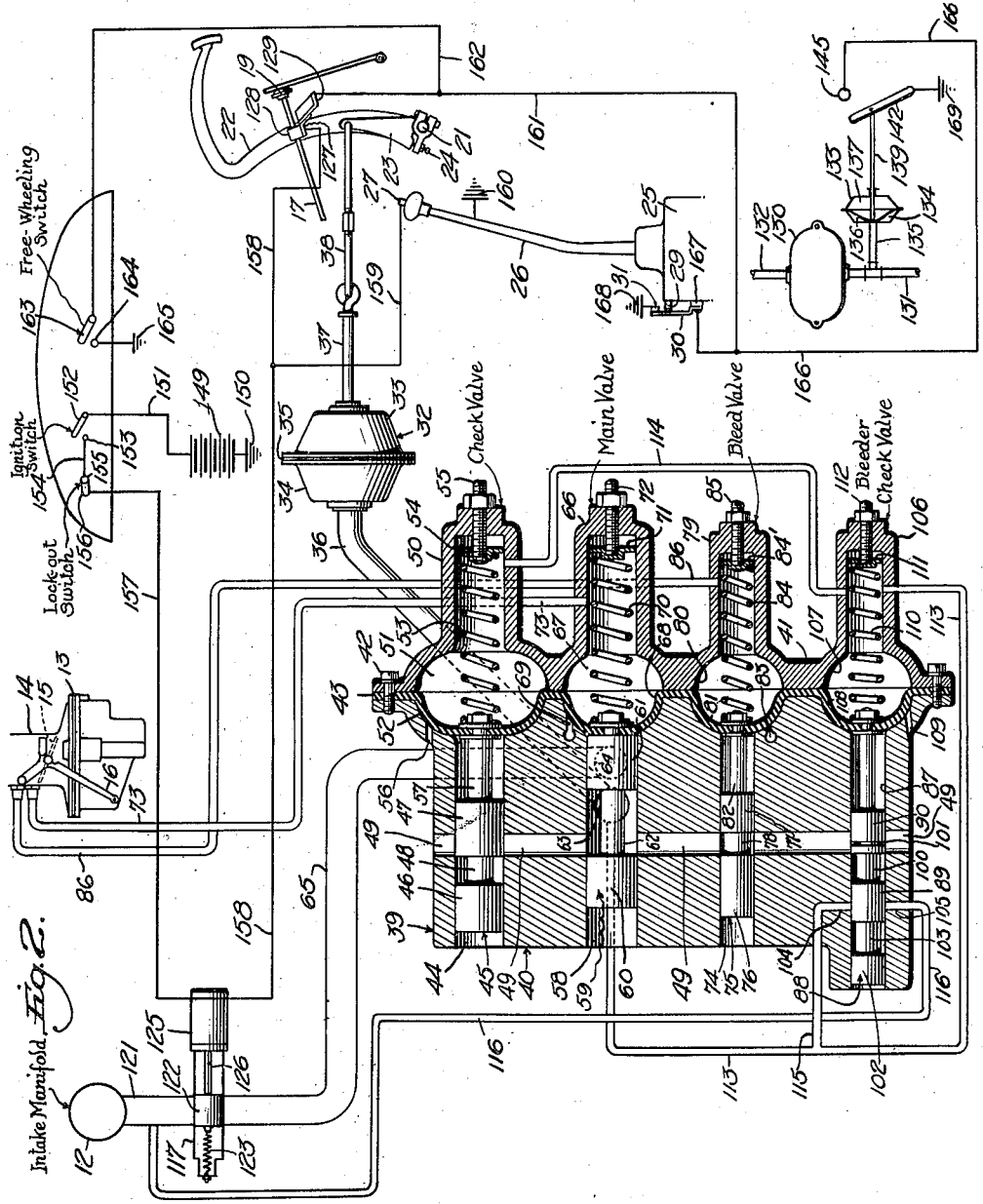

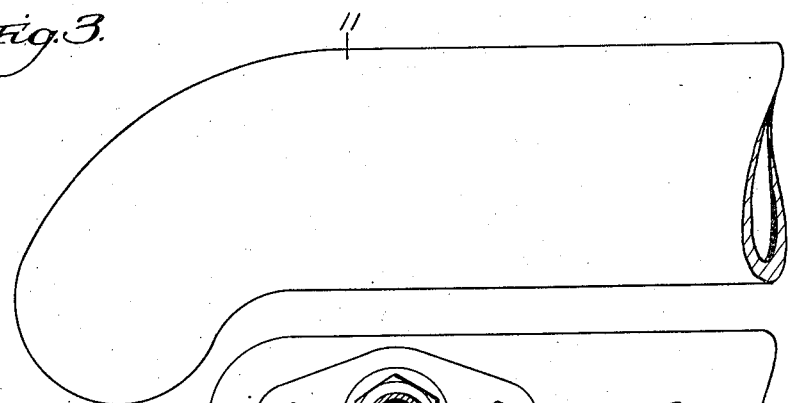
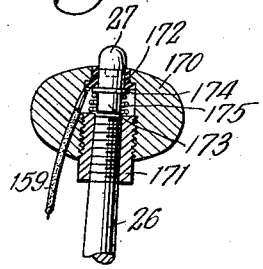
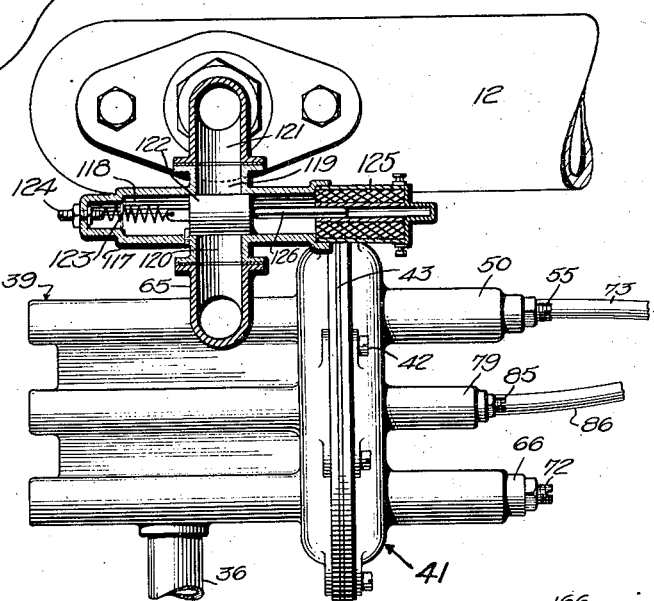
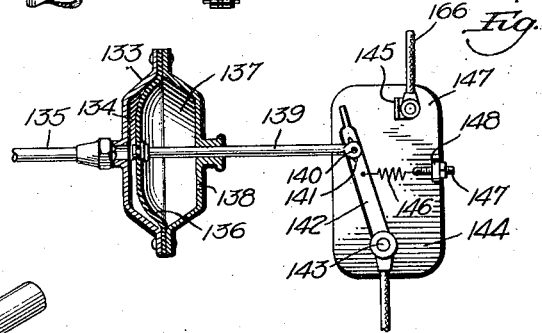
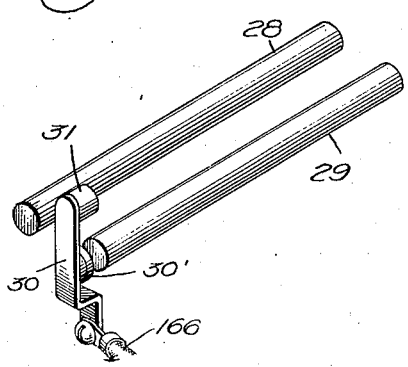

2,049,738

UNITED STATES PATENT OFFICE 2,049,738

CLUTCH CONTROL DEVICE FOR MOTOR VEHICLES

Edward G. Hill, Chicago, Ill., and Henry W. Hey, Richmond, Va., assignors to Hill Engineering Corporation, Richmond, Va., a corporation of Virginia Application June 28, 1933, Serial No. 678,078

23 Claims. (Cl. 192—.01)

This invention relates to clutch control devices for motor vehicles.

Numerous devices have been proposed for relieving the operator of a motor vehicle of having to depress the clutch pedal, as when shifting gears, and many of the prior devices are automatic in operation to permit the operator to pass through first and second gears into high gear without operating the clutch pedal. The prior devices are of various characters but the majority of them depend for their power on the partial vacuum present in the intake manifold of the motor vehicle engine. The present invention utilizes such source of power and is an improvement over the patent to Edward G. Hill, No. 1,934,671, granted November 7, 1933.

The apparatus of the copending application referred to is fully automatic in operation to permit the operator of a motor vehicle to shift out of one gear into another without operating the clutch pedal, the releasing of the accelerator pedal being the only movement required to connect the intake manifold to the power device employed for operating the clutch. Such apparatus involves many improvements over the prior art to provide smoothness and accuracy of operation, except that it does not meet the desires of individual operators in many cases. For example, the mere releasing of the accelerator pedal connects the intake manifold to the power device to effect declutching and accordingly the device operates to provide so-called "free wheeling". Many present day motor vehicles are equipped with free wheeling units or overrunning clutches to disconnect the motor from the traction wheels when the motor speed drops below the speed necessary to transmit a driving torque to the traction wheels.

Some motorists prefer free wheeling while others object to it because of its several well known disadvantages. The motorists who prefer free wheeling usually employ it in long distance driving through the open country, but lock out the free wheeling units in city driving to utilize the engine as a brake and thus minimize foot braking. The apparatus of the prior patent referred to may be readily locked out, to prevent free wheeling and to permit conventional operation of the clutch pedal, but it does not eliminate free wheeling during normal high gear driving except by operation of the lock out valve.

An important object of the present invention is to provide clutch control apparatus which embodies all of the desired characteristics of the structure described and claimed in the prior patent referred to and which embodies numerous advantages thereover to more completely meet the desires of individual motorists.

A further object is to provide an automatic clutch control apparatus which affords automatic free wheeling in first, second and reverse gears by declutching immediately upon the releasing of the accelerator pedal but which does not effect declutching in high gear except when the motor speed drops below a predetermined point, whereby automatic declutching for gear shifting is provided without the disadvantages of free wheeling in high gear unless such operation is desired by the operator.

A further object is to provide an automatic clutch control apparatus of the character referred to wherein automatic declutching takes place in high gear below a predetermined desired engine speed to effect automatic declutching at low vehicle speeds when the operator intends to stop the vehicle or when the vehicle speed decelerates to a speed wherein free wheeling is not disadvantageous and does not require frequent foot braking.

A further object is to provide an electrically operated lock out valve which may be completely controlled for any desired operation such as for complete free wheeling under all conditions or free wheeling only in first, second and reverse gears and for high gears below a predetermined motor speed.

A further object is to provide an automatic switch in the circuit of the electrical operating means for the lock out valve controlled by the speed of the motor to connect the power device to the intake manifold when the motor speed drops below a predetermined point, and adapted to be rendered inoperative when the vehicle is in first, second or reverse gears to provide automatic free wheeling when in such gears regardless of motor or vehicle speeds.

A further object is to provide readily operable means for operating the lock out valve at the will of the operator to permit shifting from high gear into intermediate gear at any time without waiting until the motor speed decelerates to a predetermined point whereby the operator is permitted to shift into intermediate gear when ascending steep grades or under any other conditions, without a reduction in vehicle speed.

A further object is to provide a shunt circuit for the electrical operating means associated with the lock out valve and to provide a readily accessible switch such as a push button or toggle switch in such shunt circuit adapted to be opened or closed and to remain in either position depending upon whether the operator desires complete free wheeling or automatic free wheeling only in first, second and reverse gears and under predetermined speeds in high gear.

A further object is to provide a novel means associated with the oil pump of the motor vehicle engine to determine the predetermined speed at which automatic declutching will be effected when the vehicle is in high gear.

A further object is to provide accuracy in the predetermined speed at which declutching will be effected in high gear by utilizing the partial vacuum present at the intake side of the oil pump of the motor for controlling the circuit of the electrical means which operates the lock out valve.

A further object is to provide a readily accessible switch in the circuit of the electrical control means referred to, for rendering the clutch control apparatus inoperative to permit conventional operation.

Other objects and advantages of the invention will become apparent during the course of the following description.

In the drawings we have shown one embodiment of the invention. In this showing:

Figure 1 is a side elevation of a motor vehicle power plant and associated elements, a portion of the vehicle being shown in section, Figure 2 is a schematic view of the clutch operating mechanism and the control means therefor, Figure 3 is a sectional view through the electrically operated lock-out valve, the main valve mechanism and a portion of the intake and exhaust manifolds of the vehicle engine being shown in section, Figure 4 is a sectional view through the differential pressure control switch operating device, parts being shown in elevation, Figure 5 is a detail perspective view of the gear-shift rods and a control switch operated by one of such rods, and, Figure 6 is an enlarged detail sectional view of the gear shift lever push button switch.

Referring to Figure 1, the numeral 10 designates a motor vehicle engine having an exhaust manifold 11 and an intake manifold 12. The motor is provided with the usual carbureter 13 connected to the intake manifold 12 by a riser 14. The carbureter is provided with the usual throttle 15 operated by an arm 16. This arm is shown as being pivotally connected to one end of an operating rod 17 projecting through the sloping floor boards 18 of the vehicle and carrying an accelerator button 19 at its rear end. The button 19 is engaged by an accelerator pedal 17' and this pedal and the rod 17 are provided with return springs 18' and 19' respectively.

The vehicle is provided with the usual clutch indicated as a whole by the numeral 20 and having an operating shaft 21 to which is secured a clamp 21' carried by the lower end of a clutch pedal 22. An operating arm 23 is mounted upon and free to turn with respect to the shaft 21 and engages a set screw 24 carried by the clamp 21'. The arm 23 is operated by means to be described and upon forward movement of the arm, motion is transmitted to the clutch shaft 21 through the arrangement of the set screw 24, as will be apparent, the set screw being provided to permit adjustment of the arm 23 to effect rotation of the shaft 21 to the proper degree.

The usual gear set 25 is arranged rearwardly of the clutch and the gears are adapted to be controlled by a gear shift lever 26 having a control button 27 at its upper end for a purpose to be described. In accordance with conventional practice, the gear shift lever 26 is movable to select the desired gear and in such movement it transmits forward or rear motion to shift rods 28 and 29 shown in detail in Figure 5. In conventional practice the gear shift lever is moved toward the left and either forwardly or rearwardly for reverse and low gears respectively, under which conditions the gear shift rod 28 is moved rearwardly or forwardly. In second gear, the gear shift lever is moved to the right and forwardly, thus moving the gear shift rod 29 rearwardly. For high gear, the gear shift lever is moved to the right and rearwardly, thus moving the gear shift rod 29 forwardly, and this movement is utilized for opening a switch 30 of any desired type normally engaging a stationary contact 31. The switch 30 is provided with a fiber or similar member 30' engageable by the shift rod 29 to prevent the grounding of the switch 30 on the shift rod. The purpose of the switch 30 will be later referred to in detail.

A power device indicated as a whole by the numeral 32 is employed for disengaging the clutch. The power device may be of any desired type but it has been found that the differential pressure diaphragm type disclosed in the prior patent of Edward G. Hill, No. 1,934,671, referred to above, and in the copending applications referred to therein is the most satisfactory in operation. Such power device includes casing sections 33 and 34, the former of which normally communicates with the atmosphere through a port 33', and a diaphragm 35 is clamped between the adjacent casing sections. Differential pressure is connected to the interior of the casing section 34, in a manner to be described, through the medium of a suitable pipe 36. The diaphragm 35 is connected to the forward end of an operating rod or shaft 37, and this shaft is connected at its rear end to the forward end of a pull rod 38. The rear end of the pull rod is connected to the upper end of the arm 23, as shown in Figure 1.

Suitable valve mechanism indicated as a whole by the numeral 39 is employed for controlling the operation of the power device 32. Except for the omission of a lock out valve manually operable for disconnecting the power device from the source of differential pressure, the valve mechanism 39 may be identical with the similar mechanism shown in the prior patent of Edward G. Hill, No. 1,934,671 referred to above. This valve mechanism is employed for connecting the power device to the intake manifold 12 to establish differential pressure in the power device, and for reestablishing pressure equalization in the power device automatically for permitting the clutch elements to return to operative engagement after they have been disengaged. It is believed unnecessary to completely illustrate the preferred structural embodiment of the valve mechanism 39, the operation of the parts of the valve mechanism being apparent in Figure 2 of the drawings.

Referring to Figure 2, the numeral 40 designates the body portion of the valve mechanism while the cap of the valve mechanism is indicated by the numeral 41. These elements are suitably secured together at their edge portions by screws 42 or other fastening elements, and a diaphragm indicated as a whole by the numeral 43 is clamped between the adjacent faces of the body 40 and cap 41. In practice the diaphragm 43 is an integral unit and portions of this unit form separate diaphragms for a purpose to be described.

The valve body is provided with a cylindrical bore 44 in which is arranged a valve indicated as a whole by the numeral 45 and including spaced heads 46 and 47 connected by a reduced shank 48. The valve body is illustrated as being provided with a passage 49 extending entirely therethrough and communicating at its opposite ends with the atmosphere. The head 47 normally closes the passage 49 adjacent one end and the reduced portion 48 of the valve opens the port or passage 49 when the valve is in operative position as will become apparent. The valve 45 constitutes the check valve of the apparatus and functions to arrest the movement of the clutch elements when they reach the point of initial engagement after having been disengaged.

The cap 41 is provided with a hollow extension 50 in axial alinement with the valve 45, and at the inner end of the extension 50 the cap 41 is provided with a suction chamber 51. A diaphragm 52, forming part of the diaphragm unit 43, is operative upon the establishment of a partial vacuum in the chamber 51 and a spring 53 normally tends to hold the diaphragm in the position shown in Figure 2. The spring is provided with an outer seat 54 adjustable by a set screw 55. The casing 40 is provided with a vent opening 56 whereby atmospheric pressure is established at all times at one side of the diaphragm 52. A shank 57 connects the diaphragm 52 to the valve head 47 whereby movement is transmitted to the check valve upon movement of the diaphragm 52.

The valve body is further provided with a cylindrical bore 58 in which is arranged a main valve indicated as a whole by the numeral 59. This valve includes spaced heads 60 and 61 connected by a reduced shank 62. The shank 62 normally opens communication through the adjacent portions of the passage 49 and the valve is movable in a manner to be described whereby the head 60 closes communication through the passage 49. The valve body is provided with a port 63 to which the pipe 36 is connected. The intake manifold is connected to the bore 58 by means of a port 64 normally closed by the valve head 61. Upon movement of the main valve toward the right as viewed in Figure 2, the space around the shank 62 affords communication between the ports 63 and 64. A vacuum conduit 65 has one end in communication with the port 64.

The cap 41 is provided with a hollow extension 66 in axial alinement with the main valve and a vacuum chamber 67 is formed in the cap 41 at the inner end of the extension 66. A diaphragm 68, forming a part of the diaphragm unit 43, is arranged in the chamber 67 and is movable upon a reduction in pressure therein. The space at the opposite side of the diaphragm communicates with the atmosphere through a port 69. The diaphragm 68 is connected to the adjacent head of the main valve and is normally urged to the position shown in Figure 2 by a suitable spring 70. The outer end of the spring engages a seat 71 adjustable by a set screw 72.

The partial vacuum for operating the diaphragm 68 is preferably derived from the carbureter riser 14 just above the throttle 15. For this purpose, a conduit 73 has one end communicating with the interior of the axial extension 66 and has its opposite end tapped into the riser 14. The connection of the pipe 73 with the riser 14 preferably is at a point just above the adjacent edge of the throttle 15 whereby a substantial reduction in pressure will occur in the chamber 67 when the throttle is in idling position whereby the diaphragm 68 will be moved by differential pressure to close the passage 49 and open communication between the ports 63 and 64.

The valve body is provided with a third cylindrical bore 74 in which is arranged a bleed valve 75 operative in a manner to be described for effecting controlled engagement of the clutch elements after their movement has been checked at the point of initial engagement by the valve 45. The bleed valve includes spaced heads 76 and 77 connected by a slightly reduced shank 78. The bleed valve is movable in a manner to be described to a position wherein the head 76 closes communication through the passage 49 and is progressively movable back toward the normal position shown to relatively slowly admit air through the passage 49. A hollow extension 79 is carried by the cap 41 in axial alinement with the valve 75 and at the inner end of the extension 79 the head is provided with a suction chamber 80. A diaphragm 81, forming a part of the diaphragm unit 43, is arranged in the chamber 80 and is connected to a stem 82 carried by the valve head 77. The side of the diaphragm 81 opposite the chamber 80 is vented to the atmosphere through a port 83.

A spring 84 has one end operating against the diaphragm 81 and the opposite end of the spring engages a seat 84' adjustable by a set screw 85. Differential pressure is employed for operating the diaphragm 81 and a manifold vacuum is preferably employed for this purpose. Accordingly a pipe 86 has one end communicating with the interior of the extension 79 and the opposite end of this pipe communicates with the riser 14 slightly above the adjacent end of the pipe 73.

The valve body is provided with a fourth cylindrical bore 87 in which is arranged a valve element indicated as a whole by the numeral 88. This valve performs two separate and distinct functions to be referred to in detail. The valve 88 includes spaced heads 89 and 90 connected by a reduced shank 100, and the head 90 is provided with a narrow peripheral groove 101 to afford restricted communication through the passage 49 for a purpose to be described. The valve 88 is normally arranged in the position shown in Figure 2 to afford limited communication through the passage 49 and is movable to an operative position with the shank 100 in registration with the passage 49 to permit substantially unrestricted communication therethrough.

The valve 88 is provided with a head 102 adjacent its outer end spaced from and connected to the head 89 by a slightly reduced shank portion 103. Ports 104 and 105 communicate with the bore 87 and are normally closed by the head 89. When the valve 88, however, is moved to the operative position referred to, the slightly reduced shank 103 affords restricted communication between the ports 104 and 105. The purpose of this arrangement is to provide maneuverability in a manner to be described, and the use of the head 102 and shank 103 as integral parts of the valve 88 is preferred for the purpose of simplicity. The main function of the valve element 88 therefore is to utilize the heads 89 and 90, shank 100 and restricted groove 101 for the purpose of preventing the clutch elements from engaging too suddenly by acting as a check on the bleed valve. The valve 88 accordingly may be termed a "bleeder check valve" and has been so designated in Figure 2.

The valve 88 is operated in a manner similar to the operation of the valve previously described. The cap 41 is provided with a hollow extension 106 in axial alinement with the valve 88 and inwardly of the extension 106, the head is provided with a suction chamber 107 communicating therewith. The diaphragm unit 43 is provided with a diaphragm element 108 arranged in the chamber 107, and the opposite side of the diaphragm 108 communicates with the atmosphere through a port 109. The inner end of a spring 110 operates against the diaphragm 108 to urge it toward the normal position shown in Figure 2. The upper end of the spring engages a seat 111 adjustable by a set screw 112.

The interior of the extension 106 communicates with one end of a pipe 113, and the opposite end of this pipe communicates with the pipe 36 to be influenced by pressure in the latter pipe and in the suction end of the power device 32. A pipe 114 has its ends connected to the extensions 50 and 106 to communicate with the interiors thereof whereby the diphragm chamber 51 is influenced by the degree of partial vacuum existing in the vacuum end of the power device as will become apparent. A pipe 115 has one end connected to the pipe 113 and its opposite end communicating with the port 104. The port 105 is influenced by the partial vacuum of the intake manifold and for this purpose it communicates with one end of a pipe 116.

The valve mechanism described is subject to control for effecting smooth positive operation of the clutch elements in accordance with the disclosure in the prior patent of Edward G. Hill referred to above. These elements are further subject to control by the means to be described to take care of additional operating conditions to meet the different ideas of individual motorists.

Referring to Figure 3, it will be noted that the upper end of the pipe 65, previously described, is connected to a valve casing 117 having a cylindrical bore 118 extending longitudinally thereof. This bore communicates with radial ports 119 and 120, the latter of which communicates with the pipe 65. A pipe 121 is connected to the valve housing 117 and communicates at one end with the port 119. The other end of the pipe 121 is connected to the intake manifold and communicates with the interior thereof. The pipe 116 is suitably tapped into the pipe 121 so that the partial vacuum of the intake manifold is always present in the pipe 116 for a purpose to be described.

A valve 122 is arranged in the bore 118 and is normally arranged in the closed position shown in Figure 3. A spring 123 is connected at one end to the valve 122 and at its opposite end to an adjustable screw 124. In the embodiment illustrated, the spring 123 is of the tension type urging the valve 122 toward the left to closed position. A solenoid 125 is mounted on the end of the valve casing 117 opposite the screw 124 and is provided with an armature 126 connected to the valve 122. Upon energization of the solenoid in a manner to be described, the armature 126 will be moved toward the right as viewed in Figure 3 whereby the valve 122 will move out of registration with the ports 119 and 120 to afford communication therebetween.

Under certain conditions to be described, and at the will of the operator, the solenoid 125 is automatically energized upon the complete releasing of the accelerator pedal to effect declutching. For this purpose, the push rod 17 is provided with a switch element 127 insulated therefrom as at 128. Upon the complete releasing of the accelerator pedal the switch element 127 engages a stationary contact 129 to complete the circuit through the solenoid 125 and thus connect the power device to the intake manifold in a manner to be described. The energization of the solenoid 125 also is adapted to take place at any time through the manual depression of the button 27 on the gear shift lever, and this operation is desirable to permit the operator to effect declutching when it is desirable to shift from high gear into second gear regardless of the automatic control means for the valve mechanism. These operations will be later referred to in detail.

The present apparatus is capable of automatic operation to effect declutching automatically in first, second and reverse gears regardless of engine or vehicle speeds and is automatically operative in high gear for effecting declutching when the engine speed is below a predetermined point. This feature is of importance for the reason that declutching is prevented when in high gear and the accelerator pedal is completely released whereby the engine operates as a brake except when the engine speed drops below the predetermined point referred to. Accordingly the vehicle does not free wheel except as the operator may desire. For the purpose of effecting declutching in high gear only when the engine and vehicle speed drop below a predetermined point, means are provided for preventing the closing of the solenoid circuit by the releasing of the accelerator when the engine and vehicle speed are above the predetermined point referred to.

We have discovered that extreme accuracy for this purpose can be secured by employing the oil pump present in all motor vehicle engines. The oil pump of the vehicle is indicated by the numeral 130 in Figure 2 and has inlet pipes 131 and 132 respectively. The pump 130 draws oil from the crank case through pipe 131 and discharges it to the various bearing surfaces of the engine through the pipe 132. When the engine is operating, a partial vacuum is always present in the pipe 131, depending upon the engine speed. This partial vacuum is utilized for controlling the solenoid circuit when the vehicle is in high gear. A diaphragm casing 133 has a suction chamber 134 in one side thereof communicating with the pipe 131 through a pipe 135. A diaphragm 136 is clamped between the sections of the casing 133 and the side of the casing 133 opposite the chamber 134 forms an air chamber 137 communicating with the atmosphere through a port 138.

A rod 139 extends into the diaphragm casing and is connected at one end to the diaphragm 136. The opposite end of the rod 139 has a pin 140 operating in a slot 141 formed in a switch arm 142. The arm 142 is pivotally connected as at 143 to an insulating block 144. A stationary contact 145 is also carried by this block and the switch arm 142 is urged toward engagement with the contact 145 by suitable spring means. For example, a tension spring 146 may be connected at one end to the switch arm 142 and at its opposite end to an adjusting screw 147 threaded through a lug 148 carried by the block 144. It will be apparent that the partial vacuum in the intake pipe of the oil pump creates a differential pressure on opposite sides of the diaphragm 136 tending to move the switch 142 away from the contact 145, and the spring 146 may be adjusted to open the contact at any predetermined speed.

preferably at a vehicle speed of ten miles per hour.

The various electrical circuits for the apparatus are shown in Figure 2 of the drawings. The vehicle battery is indicated by the numeral 149 and this battery is grounded at one side as at 150 in accordance with conventional practice. It is desirable that the electrical circuits be disconnected from the battery except when the engine is running, and accordingly the hot side of the circuit from the battery passes through the ignition switch or electrical elements directly connected thereto in order that the control circuits may be open at all times unless the ignition switch is closed. In the present instance, the system has been illustrated as including the ignition switch. A wire 151 leads from the hot side of the battery to the ignition switch 152 and this switch is engageable with a stationary contact 153 having the usual connection (not shown) to the ignition system of the vehicle and other electrical vehicle parts. A wire 154 leads from the contact 153 to a stationary contact 155 engageable by a lock out switch 156. In a manner to be described, this switch is adapted to be opened to render the entire electrical system of the present apparatus inoperative to permit conventional clutch operation, but for all other purposes, the switch 156 remains closed. This switch is preferably mounted on the dash of the vehicle to render it readily accessible.

A wire 157 is connected at one end to the switch 156 and has its opposite end connected to one terminal of the solenoid 125. The wire 158 connects the other terminal of the solenoid to the accelerator switch 127. A branch wire 159 is connected between the wire 158 and the gear shift lever button 27 and this button is depressible to electrically connect the wire 159 to the gear shift lever. This lever is, of course, grounded as at 160.

Any suitable type of push button switch may be employed on the upper end of the gear shift lever. For example, in Figure 6 the gear shift lever is indicated as being formed of a knob 170 formed of insulating material and having an insulating plug 171 threaded in its lower end and mounted on the upper end of the gear shift lever 26. A metal thimble 172 is arranged in the top of the knob 170 and receives the button 27. This button has a metallic lower end 173 provided with a flange 174 intermediate its ends engageable with the bottom of the thimble 172, and the wire 159 is connected to the thimble 172. It will be apparent that depression of the button 27 electrically connects the thimble 172 to the gear shift lever 26, thus grounding the wire 159, and the push button is urged upwardly by a coil spring 175.

The stationary accelerator contact 129 is connected to one end of a wire 161. A wire 162 is tapped into the wire 161 and leads to a manually operable switch 163 on the dash of the vehicle. The switch 163 is engageable with a stationary contact 164 grounded as at 165. The switch 163, when closed, affords automatic free wheeling in all speeds and under all conditions whenever the accelerator pedal is completely released, and this operation will be later referred to in detail.

A wire 166 has one end connected to the stationary contact 145 of the oil pump switch, and the opposite end of the wire 166 leads to the gear set switch 30. This switch is insulated from the gear set as at 167 (see Figure 2) while the stationary contact 31 is preferably directly connected to the gear set to be grounded thereon. This ground is indicated by the numeral 168 for the purpose of convenience in following the circuits in Figure 2. The oil pump switch 142 also is grounded as at 169.

The operation of the apparatus is as follows:

The apparatus is capable of automatic operation for free wheeling under all driving conditions when the accelerator pedal is completely released and is automatic in operation for free wheeling in first, second and reverse gears, and in high gear when the vehicle speed is below a predetermined point. The device also may be locked out at the will of the operator by opening the switch 156. The automatic operation wherein free wheeling takes place under all conditions upon the releasing of the accelerator pedal will be first considered in detail. Under such operating conditions, the switches 152, 156 and 163 are all in closed position.

When the operator of the vehicle starts the engine thereof the gear shift lever will be in neutral position, and prior to starting the vehicle in motion, the accelerator pedal will be in idling position. Under such circumstances, a circuit will be closed from the battery 149 through wire 151, switch 152, wire 154, switch 156, wire 157 and through the solenoid, and thence through wire 158, across the accelerator contacts 127 and 129, through wire 162 and free wheeling switch 163, and thence back to the battery through contact 164 and grounds 165 and 150. In the circuit described the three switches on the dash of the vehicle are in series with each other and with the accelerator switch, and since the dash switches remain closed, it will be apparent that the completion of the circuit referred to depends only upon the releasing of the accelerator pedal. Accordingly the solenoid 125 will be energized whenever the accelerator pedal is released, and under such conditions, automatic declutching takes place through the operation of the valve mechanism in a manner to be described.

With the gear shift lever in neutral position and the accelerator in released position, the clutch will be disengaged. The opening of the valve 122 by the energization of the solenoid 125 connects the pipes 65 and 121 and accordingly the port 64 of the main valve will be connected to the intake manifold. With the accelerator in idling position, the throttle will be substantially closed and the partial vacuum existing above the throttle will be communicated through the pipe 73 to the diaphragm chamber 67 of the main valve, thus moving this valve to the operative position wherein the head 60 closes communication through the passage 49 while the ports 63 and 64 will be connected to each other. Accordingly the pipe 36 and the suction chamber of the power device will be connected to the intake manifold, thus holding the clutch in disengaged position. This condition will remain under the automatic operations being considered, as long as the accelerator is in idling position. Accordingly the operator may place the gear shift lever in low gear preparatory to starting the vehicle.

Under the conditions previously described, that is, with the throttle substantially closed, a partial vacuum also will be established in the remaining three diaphragm chambers of the valve mechanism, namely, the chambers 51, 80 and 107. Such partial vacuum is maintained in the bleed valve chamber 80 through the pipe 86 which is connected to the riser 14 slightly above the throttle when the latter is in closed or idling position. The pipe 113 communicates at one end with the interior of the bleeder check valve extension 106 and at its opposite end the pipe communicates with the vacuum conduit 36. With the clutch held in disengaged position by the partial vacuum in the power device and in the conduit 36, the same partial vacuum will exist in the chamber 107 by virtue of the pipe connection 113. The chamber 107 communicates with the check valve chamber 51 through the pipe 114, and accordingly a partial vacuum will exist in the chamber 51. Thus it will be apparent that all of the valves will be held in their operative positions whenever the clutch is disengaged and the throttle is in idling position.

After the operator has placed the gear shift lever in low gear position it merely is necessary for him to depress the accelerator to start the vehicle in forward motion, and the proper engaging of the clutch elements takes place automatically upon the initial depression of the accelerator. The connection will be broken between the switch 127 and contact 129, thus breaking the previously described circuit through the solenoid 125 whereupon the spring 123 moves the solenoid valve 122 to closed position.

Thus the vacuum port 64 of the valve mechanism will be disconnected from the intake manifold, although a partial vacuum will be retained in the power device. In this connection attention is invited to the fact that the pipe 116 is tapped into the pipe 121 which is always in communication with the intake manifold, and since, under the conditions being considered, the bleeder check valve is in operative position, restricted communication will be afforded between the pipe 116 and the pipe 115 through the ports 104 and 105 around the slightly reduced shank 103. This shank is only slightly smaller than the heads 89 and 102 in order to restrict communication between the ports 104 and 105 for a reason which will become apparent. The pipe 115 communicates with the pipe 113 leading to the vacuum conduit 36, and accordingly the partial vacuum in the power device will be retained to hold the clutch disengaged pending further operations to be described. The pipe 113 communicates with the chamber 107 and the latter communicates with the check valve chamber 51, and the partial vacuum also will be retained in these chambers to hold the check valve and bleeder check valve in their operative positions.

When the check valve is in operative position, the shank 48 is in alinement with the passage 49 whereby the latter is open to the atmosphere ready to admit air to the power device to permit the clutch elements to start to return to operative position. The opposite end of the passage 49 is open for the reason that the shank 100 is in alinement therewith, but the passage referred to is closed between the bleeder check valve and the main valve by the head 76 of the bleed valve when the latter is in operative position.

Accordingly the only result which follows the breaking of the solenoid circuit at the accelerator contact 127 will be the closing of the solenoid valve 122. Upon further movement of the accelerator, the throttle will progressively open and since the connection between the pipe 73 and the riser is very close to the adjacent edge of the throttle, a relatively slight opening movement of the throttle admits air into the pipe 73 thus destroying the partial vacuum in the main valve chamber 67 to permit the springs 70 to move the main valve to its normal or open position. Under such conditions, the ports 63 and 64 will be disconnected and the port 63 will be connected to the passage 49 which is open to the atmosphere at one end around the shank 48 and is closed to the atmosphere at its other end by the bleed valve head 76. Upon the return movement of the main valve to normal position, air rushes through passage 49 and port 63 and thence through the conduit 36 to the power device, thus reducing the pressure differential therein to permit the clutch elements to move toward engaged position.

The rush of air through the conduit 36 is communicated to the check valve chamber 51 through the pipes 113 and 114 and there will be an immediate increase in pressure in the chambers 51 and 107. At this point, attention may be invited to the fact that the spring 110 is relatively weak and does not move the bleeder check valve to the normal position shown in Figure 2 except when the pressure from the chamber 107 approaches that of the atmosphere. Such pressure is not reached under the conditions being considered, and accordingly the bleeder check valve remains in operative position. The spring 53 associated with the check valve is substantially stronger, however, and upon the flow of air into the chamber 51, the spring 53 moves the check valve toward normal position until the head 47 nearly closes the adjacent end of the passage 49.

During this time, the pipe connection 116 and associated connections tends to reduce the pressure in the power device while the movement of the diaphragm of the power device under the influence of the clutch spring tension also tends to reduce the pressure in the power device. Accordingly the rush of air into the power device through the movement of the main valve to normal position, merely reduces the pressure differential in the power device to an extent sufficient to permit movement thereof toward engaged position and the rate of movement of air into the power device depends on three factors, namely, the area of the diaphragm of the power device, the speed of movement of the diaphragm, and the area of the orifice existing when the check valve head moves nearly to closed position in the manner referred to. The relationship of these three elements is readily varied to secure proper operation by adjusting the tension of the spring 53 by means of the screw 55.

The relationship between the three elements referred to is automatically destroyed upon the initial engagement of the clutch elements since the speed of movement of the diaphragm of the power device is reduced. Thus the flow of air into the power device satisfies the partial vacuum to a greater extent and the increase in pressure thus occurring in the power device is communicated to the check valve through pipes 113 and 114, whereupon the spring 53 moves the check valve to its normal closed position to prevent the further admission of air into the power device. Thus the movement of the clutch elements will be completely arrested substantially at the point of initial engagement.

At the point of initial engagement of the clutch elements there is substantially no torque delivered through the clutch, and accordingly no movement will be imparted to the vehicle. Assuming that the operator depresses the accelerator pedal only sufficiently to effect the automatic operations thus far described, the clutch elements will remain indefinitely at the point of initial engagement. The fixed leak provided around the bleeder check valve shank 103 tends constantly to reduce the pressure in the power device through the pipes 116, 115 and 113. Thus the clutch elements are held retracted to the point of initial engagement and any tendency to reduce the pressure in the power device too greatly so as to retract them beyond the point of initial engagement is prevented by virtue of the fact that the pressure in the pipe 113 is also communicated to the check valve chamber 51. Accordingly any tendency for too great a reduction in pressure in the power device will result in a similar reduction in the chamber 51 to "crack" the check valve to admit additional air to the passage 49.

Upon continued depression of the accelerator pedal, additional air flows into the riser 14 to increase the pressure therein and this increase in pressure is communicated to the bleed valve chamber 80 whereby the pressure in this chamber progressively increases to permit the spring 84 to move the check valve toward normal or open position upon the progressive opening of the throttle. During this period, the bleeder check valve remains in open position for the reason that a partial vacuum still exists in the chamber 107 to a sufficient extent to overcome the tension of the spring 110. Thus air is admitted into the lower end of the passage 49 as viewed in Figure 2 and the admission of air into the power device depends upon the position of the bleed valve. As this valve progressively opens upon the progressive opening movement of the throttle, the passage 49 will be increasingly opened by the shank 78 of the bleed valve, and accordingly air will be admitted into the power device to tend to establish pressure equalization therein whereby the clutch springs move the clutch elements into operative engagement.

The speed of engagement of the clutch elements will depend upon the speed of movement of the bleed valve which, in turn, depends upon the rate of opening of the throttle. In low gear, the throttle should be opening relatively slowly to admit air at a relatively slow rate to the power device, but the present device operates to prevent a careless or inexperienced driver from admitting air too rapidly to the power device to cause the grabbing of the clutch and the jerking or lunging of the vehicle. Assuming that the accelerator is slowly opened, the clutch elements will move slowly and smoothly into operative engagement and as atmospheric pressure is reached in the suction side in the power device, this pressure acting through the pipe 113 slightly overbalances the suction-creating tendency of the pipe 116. This condition causes a sufficient increase in pressure in the bleeder check valve chamber 107 to permit the spring 110 to move the bleeder check valve to normal position shown in Figure 2, whereupon communication will be cut off between the ports 104 and 105, and the partial vacuum existing in the pipe 116 performs no useful function.

If the operator through carelessness or inexperience presses the accelerator pedal too rapidly after the clutch elements are initially engaged, the rush of air into the power device will be communicated through pipe 113 to the bleeder check valve 107, whereupon the spring 110 moves the bleeder check valve to closed position. Regardless of the position of the bleed valve under such conditions, the flow of air into the power device will be restricted by the small groove 101 in the valve head 90, and thus movement of the clutch elements will be checked just prior to final engagement and the jerking or lunging of the vehicle will be prevented. Thus the valve mechanism operates automatically to provide a smooth start from a standstill regardless of the operation of the throttle.

Assuming that the operator is moving a vehicle out from a curb or similar parking place, it is advisable for him to exercise care to prevent pulling out into the path of approaching drivers. The operator depresses the accelerator slightly beyond the point necessary to effect initial clutch engagement and accordingly partial clutch engagement takes place to cause the vehicle to move slowly away from the curb. In this connection, attention is invited to the fact that when the bleeder check valve is in open position, the constant leakage past the shank 103 tends to reduce pressure in the power device and it is necessary to depress the accelerator pedal to a sufficient extent to cause the opening around the shank 78 of the bleed valve to overbalance the fixed leakage around the shank 103 before the clutch elements move beyond the point of initial engagement. At the point where the bleed valve overbalances the bleeder check valve, the clutch elements start to move into operative engagement to transmit movement to the vehicle. If the vehicle is pulling away from a curb or similar place at such time and the operator desires to slow down to permit an approaching vehicle to pass, it merely is necessary for him to slightly release the accelerator to reduce the pressure in the diaphragm chamber 80 to move the bleed valve past the point where the leakage around the shank 78 equals the leakage around the bleeder check valve shank 103. Vacuum leakage thus will overbalance the air leakage whereupon the clutch elements will be retracted substantially to the point of initial engagement and no further movement will be imparted to the vehicle until the accelerator is again operated.

Conditions previously described assume that the gear shift lever is in low gear position. If the operator continues to depress the accelerator pedal until the clutch elements are in full engagement and the vehicle speed accelerates to a substantial extent, he is then ready to shift into intermediate gear. The vehicle having attained sufficient momentum, it merely is necessary for the operator to release the accelerator pedal whereupon the throttle will return to idling position and the circuit through the solenoid 125 will be reestablished at the contact 127. The condition of the clutch operating mechanism will return to the condition previously described with the clutch elements disengaged and all of the valves of the control mechanism in operative position ready for subsequent operation. The clutch being disengaged, it is merely necessary for the operator to shift the gear shift lever 26 into intermediate position and then to depress the accelerator in the manner previously described, whereupon the clutch elements will be reengaged. After sufficient vehicle momentum has been attained, the operator is ready to shift into high gear, which operation is accomplished after merely releasing the accelerator pedal in the manner previously described.

The releasing of the accelerator pedal under any conditions will cause declutching and with the switches 156 and 163 closed, full automatic free wheeling is provided. For example, when the vehicle is traveling at a normal rate in high gear, it merely is necessary to release the accelerator whereupon declutching takes place to provide free wheeling. To reestablish driving connection between the engine and traction wheels, the operator merely depresses the accelerator to the desired extent whereupon clutch reengagement takes place.

Many vehicle operators consider free wheeling an objectionable feature under any conditions, and many motorists who prefer free wheeling for open country driving do not employ it for city driving. Free wheeling may be dispensed with very readily in the present system through the simple expedient of opening the switch 163. When this is done automatic free wheeling is provided in first, second and reverse gears to afford accuracy of gear shifting, without using the clutch pedal, but free wheeling will not occur in high gear except when the vehicle speed drops below a predetermined point. With the switch 163 open, the vehicle engine may be employed as a brake during normal high gear driving except at relatively low vehicle speeds, thus eliminating the frequent use of the foot brake.

Assuming that the switch 163 is open, and the vehicle is in either first, second or reverse gears, the gear set switch 30 will be in close position and thus the wire 161 will be grounded through wire 166, switch 30, contact 31 and ground 168 instead of through the free wheeling switch 163. The accelerator switch is in series with the gear set switch, and accordingly declutching will occur automatically upon the releasing of the accelerator whenever the vehicle is in first, second or reverse gears. Thus the operation of the clutch control mechanism will be the same as previously described when in first, second or reverse gears to facilitate gear shifting.

A different condition exists, however, when the vehicle is in high gear. The gear set switch 30 is in the path of travel of the shift rod 29 when the gear shift lever is moved to high gear position and under such conditions the switch 30 will be moved out of engagement with the contact 30 to break the connection between the wire 161 and ground 168, and so far as the gear set switch is concerned, declutching will not be effected in high gear upon the releasing of the accelerator pedal. However, the wire 166 is connected to the contact 145, and whenever the vehicle speed drops below a predetermined point, a corresponding drop will occur in the partial vacuum in the oil pump intake pipe 131 whereupon the spring 146 will move the switch arm into engagement with the contact 145. Under such conditions, the wire 166 will be grounded at 169 to effect declutching upon the releasing of the accelerator.

The vehicle speed at which the switch 142 will be closed may be determined by the operator by adjusting the screw 147 (see Figure 4) to vary the tension of the spring 146. In practice, it has been found advisable to permit the switch 142 to close when the vehicle is traveling below approximately ten miles per hour. Accordingly at speeds above ten miles per hour declutching will not be effected since the switch 142 will be held in open position by the partial vacuum existing in the pipe 131 acting through the pipe 135, while the gear set switch 30 will be held in open position by the shift rod 29. Under such conditions, the vehicle may be employed as a brake, but when the vehicle is being brought to a stop, automatic declutching will be effected when the vehicle speed decelerates to a point below ten miles per hour without any attention on the part of the operator. Thus the vehicle may be brought to a stop and the gear shift lever moved to neutral position without operation of the clutch pedal.

In accordance with the foregoing operation, automatic free wheeling occurs when the vehicle is in high gear whenever the driver releases the accelerator pedal and the vehicle speed drops below approximately ten miles per hour. As previously stated, this operation permits the driver to utilize the engine as a brake during normal driving and eliminates the necessity for depressing the clutch pedal when bringing the vehicle to a stop. However, it will frequently occur that a driver will not desire free wheeling at low vehicle speeds when in high gear as for example, when a vehicle is being driven in heavy city traffic at low speeds. It will be apparent that the driver readily may accomplish the desired result by the simple expedient of holding the accelerator pedal very slightly depressed to break the engagement between the contacts 127 and 129, under which conditions free wheeling will not occur at low vehicle speeds.

In the event a driver does not desire to employ automatic free wheeling under all conditions or automatic free wheeling for gear shifting purposes, it merely is necessary for him to open the lock out switch 156, whereupon conventional clutch operation may be practiced. The switch 156 is arranged in series with the solenoid 125 regardless of which of the control circuits is closed and when the switch referred to is open, the solenoid valve 122 will remain in closed position and the power device cannot be connected to the intake manifold for automatic operation. The clutch pedal 22 is freely movable by the foot of the operator without effecting movement of the power device or associated parts since the arm 23 is not connected to the shaft 21 and is operated only by the power device.

From the foregoing, it will be apparent that the present apparatus provides clutch operation in accordance with the individual desires of operators. The two switches 156 and 163 are conveniently located for access by the driver, and by opening the switch 156 the vehicle may be driven in accordance with conventional practice by foot operation of the clutch. By closing both switches 156 and 163, free wheeling will be afforded under all operating conditions merely by releasing the accelerator pedal. For automatic clutch operation without free wheeling in high gear at normal driving speeds, it merely is necessary to close the switch 156 and open the switch 163, whereupon free wheeling for gear shifting purposes takes place in first, second and reverse gears, but free wheeling will not take place in high gear except below a predetermined relatively low vehicle speed. The operation of the valve mechanism is fully automatic for providing smooth clutch engagement under all conditions and the association of the electrical system therewith determines the conditions under which clutch operation takes place depending upon the desires of individual drivers.

In accordance with the foregoing description, free wheeling occurs when the switch 163 is open and the switch 156 is closed in first, second and reverse gears, and in high gear when the vehicle speed is below a predetermined point. This operation of course, has been described in connection with a conventional vehicle transmission including a gear shift lever selectively movable to different positions in accordance with the desired gear ratio. However, there is an increasing tendency toward the development of automatic transmissions, and particularly torque responsive transmissions wherein the gear ratios are automatically changed in accordance with the torque reaction of the traction wheels of the vehicle. Accordingly the present invention is not limited to use with conventional transmissions including gear shifting levers but is equally applicable to automatic transmissions. Where the term "high gear" occurs in the following claims, therefore, it is understood that this expression is intended to cover gear ratio conditions in automatic transmissions corresponding to high gear in conventional transmissions.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. Clutch operating mechanism for motor vehicles having an engine provided with a throttle, and a clutch and gear shifting mechanism comprising a power device connected to the motor vehicle clutch, control means operative upon movement of the engine throttle to idling position for rendering the power device operative for disengaging the clutch, and means operative by the vehicle gear shifting mechanism when the latter is in high gear and the engine speed is above a predetermined point for rendering said control means inoperative when the engine throttle is in idling position.

2. Clutch operating mechanism for motor vehicles having an engine provided with a throttle, and a clutch and gear shifting mechanism comprising a power device connected to the motor vehicle clutch, control means operative upon movement of the engine throttle to idling position for rendering the power device operative for disengaging the clutch, and means operative by the vehicle gear shifting mechanism when the latter is in high gear and the engine speed is above a predetermined point for rendering said control means inoperative when the engine throttle is in idling position, said control means having positions operative upon opening movement of the engine throttle for releasing the clutch elements for movement into operative engagement.

3. Clutch operating mechanism for motor vehicles having an engine provided with a throttle, and a clutch and gear shifting mechanism comprising a differential pressure power device connected to the motor vehicle clutch, valve mechanism for said power device, governing means for the valve mechanism operative upon movement of the engine throttle to idling position for rendering said valve mechanism effective for connecting the power device to a source of differential pressure to disengage the clutch, and means operative by the vehicle gear shifting mechanism when the latter is in high gear and the engine speed is above a predetermined point for rendering said governing means ineffective for rendering said power device operative for disengaging the clutch when the engine throttle is in idling position.

4. Clutch operating mechanism for motor vehicles having an engine provided with a throttle, and a clutch and gear shifting mechanism, comprising a differential pressure power device connected to the motor vehicle clutch, valve mechanism for said power device, governing means for the valve mechanism operative upon movement of the engine throttle to idling position for rendering said valve mechanism operative for connecting the power device to a source of differential pressure to disengage the clutch, and means operative by the vehicle gear shifting mechanism when the latter is in high gear and the engine speed is above a predetermined point for rendering said governing means ineffective for rendering said power device operative for disengaging the clutch when the engine throttle is in idling position, said valve mechanism including means operative upon opening movement of the engine throttle for controlling said valve mechanism to disconnect the power device from the source of differential pressure and connect it to the atmosphere to release the clutch elements for movement into operative engagement.

5. Clutch operating mechanism for motor vehicles having an engine provided with a throttle, and a clutch and gear shifting mechanism, comprising a power device connected to the vehicle clutch, control means operative upon movement of the engine throttle to idling position for rendering the power device operative for disengaging the clutch, said control means including an electric circuit having a switch in series therewith and adapted to be closed when the engine throttle is in idling position, and means operative by the vehicle gear shifting mechanism when the latter is in high gear position and the engine speed is above a predetermined point for rendering said control means inoperative.

6. Clutch operating mechanism for motor vehicles having an engine provided with a throttle, and a clutch and gear shifting mechanism comprising a power device connected to the vehicle clutch, control means operative upon movement of the engine throttle to idling position for rendering the power device operative for disengaging the clutch, said control means including an electric circuit having a switch in series therewith and adapted to be closed when the engine throttle is in idling position, and means operative by the vehicle gear shifting mechanism when the latter is in high gear position and the engine speed is above a predetermined point for rendering said control means inoperative when the engine throttle is in idling position, said control means having portions operative when the clutch is disengaged and the engine throttle is opened for releasing the clutch elements for movement into operative engagement.

7. Clutch operating mechanism for motor vehicles having an engine provided with a throttle, and an intake manifold, a clutch and a gear shifting mechanism, comprising a differential pressure power device, valve mechanism operative for connecting the power device to the intake manifold of the vehicle engine for disengaging the clutch, a vacuum conduit between the intake manifold of the vehicle engine and the valve mechanism, means including an electric circuit having a control device in series therewith energizable for opening said conduit, said last named means further including a switch in series with said circuit and movable to closed position when the engine throttle is in idling position, and means operative by the vehicle gear shifting mechanism when the latter is in high gear position and the engine speed is above a predetermined point for maintaining said control device deenergized and closing said conduit, said valve mechanism including means operative when the clutch is disengaged and upon opening movement of the engine throttle for releasing the clutch elements for movement into operative engagement.

8. Clutch operating mechanism for motor vehicles having an engine provided with a throttle, and an intake manifold, a clutch and a gear shifting mechanism, comprising a differential pressure power device, valve mechanism operative for connecting the power device to the intake manifold of the vehicle engine for disengaging the clutch, a vacuum conduit between the intake manifold of the vehicle engine and the valve mechanism, means including an electric circuit having a control device in series therewith energizable for opening said conduit, said last named means further including a switch in series with said circuit and movable to closed position when the engine throttle is in idling position, a second switch in said circuit normally closed and adapted to be opened by the vehicle gear shifting mechanism when the latter is in high gear, and means for closing said circuit independently of said last named switch when the engine speed is below a predetermined point to render said last named switch effective for deenergizing said control device to open said conduit only when the engine speed drops below said predetermined point, said valve mechanism including means operative when the clutch elements are disengaged and upon opening movement of the engine throttle for releasing the clutch elements for movement into operative engagement.

9. Clutch operating mechanism for motor vehicles having an engine provided with a throttle, and an intake manifold, a clutch and a gear shifting mechanism, comprising a differential pressure power device, valve mechanism operative for connecting the power device to the intake manifold of the vehicle engine for disengaging the clutch, a vacuum conduit between the intake manifold of the vehicle engine and the valve mechanism, means including an electric circuit having a control device in series therewith energizable for opening said conduit, said last named means further including a switch in series with said circuit and movable to closed position when the engine throttle is in idling position, means operative by the vehicle gear shifting mechanism when the latter is in high gear position and the engine speed is above a predetermined point for maintaining said control device deenergized and closing said conduit, and manually operable means for rendering operation of said last named means ineffective for preventing the closing of said circuit, said valve mechanism including means operative when the clutch is disengaged and upon opening movement of the engine throttle for releasing the clutch elements for movement into operative engagement.

10. Clutch operating mechanism for motor vehicles having an engine provided with a throttle, and an intake manifold, a clutch and a gear shifting mechanism, comprising a differential pressure power device, valve mechanism operative for connecting the power device to the intake manifold of the vehicle engine for disengaging the clutch, a vacuum conduit between the intake manifold of the vehicle engine and the valve mechanism, means including an electric circuit having a control device in series therewith energizable for opening said conduit, said last named means further including a switch in series with said circuit and movable to closed position when the engine throttle is in idling position, a second switch in said circuit normally closed and adapted to be opened by the vehicle gear shifting mechanism when the latter is in high gear, means for closing said circuit independently of said second named switch when the engine speed is below a predetermined point to open said conduit only when the engine speed drops below said predetermined point, a shunt circuit around said second named switch, and a manually operable switch in said shunt circuit adapted to be closed to render said second named switch ineffective, said valve mechanism including means operative when the clutch elements are disengaged and upon opening movement of the engine throttle for releasing the clutch elements for movement into operative engagement.

11. Clutch operating mechanism for motor vehicles having an engine provided with a throttle, and an intake manifold, a clutch and a gear shifting mechanism, comprising a differential pressure power device connected to the motor vehicle clutch, valve mechanism for said power device, a conduit connecting said valve mechanism to the intake manifold of the vehicle engine, a valve in said conduit normally biased to closed position, means operative for opening said valve when the engine throttle is in idling position, actuating means for the valve mechanism operative upon movement of the throttle to idling position for connecting the power device to the intake manifold when said valve is open, and means operative by the vehicle gear shifting mechanism when the latter is in high gear and the engine speed is above a predetermined point for rendering said first named means inoperative for opening said valve, said valve mechanism including means operative upon opening movement of the throttle for controlling said valve mechanism to release the clutch elements for movement into operative engagement.

12. Clutch operating mechanism for motor vehicles having an engine provided with a throttle, and an intake manifold, a clutch and a gear shifting mechanism, comprising a differential pressure power device connected to the motor vehicle clutch, valve mechanism for said power device, a conduit connecting said valve mechanism to the intake manifold of the vehicle engine, a valve in said conduit normally biased to closed position, means operative for opening said valve when the engine throttle is in idling position, actuating means for the valve mechanism operative upon movement of the throttle to idling position for connecting the power device to the intake manifold when said valve is open, means operative by the vehicle gear shifting mechanism when the latter is in high gear and the engine speed is above a predetermined point for rendering said first named means inoperative for opening said valve, and manually operable means for rendering said last named means ineffective for preventing the opening of said valve, said valve mechanism including means operative upon opening movement of the throttle for controlling said valve mechanism to release the clutch elements for movement into operative engagement.

13. Clutch operating mechanism for motor vehicles having an engine provided with a throttle, and an intake manifold, a clutch and a gear shifting mechanism, comprising a differential pressure power device connected to the motor vehicle clutch, valve mechanism for said power device, a conduit connecting said valve mechanism to the intake manifold of the vehicle engine, a valve in said conduit normally biased to closed position, a solenoid energizable for opening said valve, a circuit for said solenoid including a switch movable to closed position when the engine throttle is in idling position, actuating means for the valve mechanism operative upon movement of the throttle to idling position for connecting the power device to the intake manifold when said valve is open, and means operative by a vehicle gear shifting mechanism when the latter is in high gear position and the engine speed is above a predetermined point for preventing the closing of said circuit, said valve mechanism including means operative upon opening movement of the throttle for controlling said valve mechanism to release the clutch elements for movement into operative engagement.

14. Clutch operating mechanism for motor vehicles having an engine provided with a throttle, and an intake manifold, a clutch and a gear shifting mechanism, comprising a differential pressure power device connected to the motor vehicle clutch, valve mechanism for said power device, a conduit connecting said valve mechanism to the intake manifold of the vehicle engine, a valve in said conduit normally biased to closed position, a solenoid energizable for opening said valve, a circuit for said solenoid including a switch movable to closed position when the engine throttle is in idling position, actuating means for the valve mechanism operative upon movement of the throttle to idling position for connecting the power device to the intake manifold when said valve is open, means operative by the vehicle gear shifting mechanism when the latter is in high gear position and the engine speed is above a predetermined point for preventing the closing of said circuit, and manually operable means for rendering said last named means ineffective, said valve mechanism including means operative upon opening movement of the throttle for controlling said valve mechanism to release the clutch elements for movement into operative engagement.

15. Clutch operating mechanism for motor vehicles having an engine provided with a throttle, and an intake manifold, a clutch and a gear shifting mechanism, comprising a differential pressure power device connected to the motor vehicle clutch, valve mechanism for said power device, a conduit connecting said valve mechanism to the intake manifold of the vehicle engine, a valve in said conduit normally biased to closed position, a solenoid energizable for opening said valve, a circuit for said solenoid including a switch movable to closed position when the engine throttle is in idling position, actuating means for the valve mechanism operative upon movement of the throttle to idling position for connecting the power device to the intake manifold when said valve is open, a second switch in said circuit normally biased to closed position and movable to open position by the vehicle gear shifting mechanism when the latter is in high gear, a shunt circuit around said last named switch, and means for closing said shunt circuit when the engine speed drops below a predetermined point, said valve mechanism including means operative upon opening movement of the throttle for controlling the valve mechanism to release the clutch elements for movement into operative engagement.

16. Clutch operating mechanism for motor vehicles having an engine provided with a throttle, and an intake manifold, a clutch and a gear shifting mechanism, comprising a differential pressure power device connected to the motor vehicle clutch, valve mechanism for said power device, a conduit connecting said valve mechanism to the intake manifold of the vehicle engine, a valve in said conduit normally biased to closed position, a solenoid energizable for opening said valve, a circuit for said solenoid including a switch movable to closed position when the engine throttle is in idling position, actuating means for the valve mechanism operative upon movement of the throttle to idling position for connecting the power device to the intake manifold when said valve is open, a second switch in said circuit normally biased to closed position and movable to open position by the vehicle gear shifting mechanism when the latter is in high gear, a shunt circuit around said last named switch, means for closing said shunt circuit when the engine speed drops below a predetermined point, a second shunt circuit around said second named switch, and a manually operable switch in said second shunt circuit, said valve mechanism including means operative upon opening movement of the throttle for controlling the valve mechanism to release the clutch elements for movement into operative engagement.

17. Clutch operating mechanism for motor vehicles comprising a differential pressure power device connected to the motor vehicle clutch, valve mechanism for said power device, a conduit connecting said valve mechanism to the intake manifold of the vehicle engine, a valve in said conduit normally biased to closed position, a solenoid energizable for opening said valve, a circuit for said solenoid including a switch movable to closed position when the engine throttle is in idling position, actuating means for the valve mechanism operative upon movement of the throttle to idling position for connecting the power device to the intake manifold when said valve is open, a second switch in said circuit having a normal bias to closed position and adapted to be opened by the vehicle gear shifting mechanism when the latter is in high gear, a shunt circuit around said second switch including a third switch biased to closed position, and a control device for said third switch operative upon a decrease in pressure in the intake side of the engine oil pump for opening said third switch when the engine speed is above a predetermined point, said valve mechanism including means operative upon opening movement of the throttle for controlling said valve mechanism to release the clutch elements for movement into operative engagement.

18. Apparatus constructed in accordance with claim 17 provided with a second shunt circuit for said second switch, and a manually operable switch in said second shunt circuit adapted to remain in either open or closed position.

19. Apparatus constructed in accordance with claim 17 provided with a second shunt circuit around said second switch, and a switch in said second shunt circuit mounted on the gear shift lever of the vehicle and normally biased to open position.

20. Apparatus constructed in accordance with claim 17 provided with a second shunt circuit around said second switch, a switch in said second shunt circuit mounted on the gear shift lever of the vehicle and normally biased to open position, a third shunt circuit for said second switch, and a manually operable switch in said third shunt circuit adapted to remain in either open or closed position.

21. The combination of an internal combustion engine, a vacuum operated clutch, a variable gear shift, an accelerator, means effective to render the clutch operable by the vacuum when the accelerator is in a predetermined position, and means effective to render the clutch ineffective for operation by the vacuum in such position of the accelerator when the gear shift is in a predetermined position.

22. The combination of an internal combustion engine, a vacuum operated clutch, a variable gear shift, an accelerator, means effective to render the clutch operable by the vacuum when the accelerator is in release position, and means effective to render the clutch ineffective for operation by the vacuum when the gear shift is in high gear.

23. The combination of an internal combustion engine, a vacuum operated clutch, a gear shift, a driven element, a fuel control element, means effective to render the clutch normally operable by the vacuum when the fuel control element is in a predetermined position and the speed of the driven element allows shifts of the gear shift in its range between neutral and high gear, and means effective to render the clutch ineffective for operation by the vacuum in such position of the fuel control element when the gear shift is shifted to high gear.

EDWARD G. HILL.
HENRY W. HEY.